May 19, 1970 — R. M. VAUGHN — 3,512,447
FRANGIBLE NUT FASTENER
Filed Feb. 3, 1969 — 2 Sheets-Sheet 1

INVENTOR.
RUDOLPH MARION VAUGHN
BY
Elliott & Pastoriza
ATTORNEYS

May 19, 1970 R. M. VAUGHN 3,512,447
FRANGIBLE NUT FASTENER
Filed Feb. 3, 1969 2 Sheets-Sheet 2

INVENTOR.
RUDOLPH MARION VAUGHN
BY
Elliott & Pastoriza,
ATTORNEYS

United States Patent Office 3,512,447
Patented May 19, 1970

---

3,512,447
FRANGIBLE NUT FASTENER
Rudolph Marion Vaughn, 2172 Salt Air Drive,
Santa Ana, Calif. 92705
Continuation-in-part of application Ser. No. 758,275,
Sept. 9, 1968. This application Feb. 3, 1969, Ser.
No. 800,808
Int. Cl. F16b 31/02, 39/12
U.S. Cl. 85—61                     5 Claims

ABSTRACT OF THE DISCLOSURE

A frangible nut is provided for cooperation with a bolt in fastening first and second members together. The frangible nut includes an annular side wall having internal threads for threading to the bolt threads and at least one annular groove intermediate the ends of the nut to define a thinned annular wall section dividing the nut into first and second portions. Driving of the nut by torquing the upper or first portion seats the second portion on one of the members and further torquing then breaks the first portion from the second portion at the thinned wall section effectively provide two nuts. Further torquing of the first portion against the second portion effectively locks the nut portions to the bolt by placing the bolt threads in tension.

---

This application is a continuation in part of my co-pending application Ser. No. 758,275 filed Sept. 9, 1968, and entitled Frangible Nut Fastener, now abandoned.

This invention relates generally to bolt and nut type fasteners and more particularly, to an improved nut structure for use with bolts in securing first and second members together.

BACKGROUND OF THE INVENTION

It is vitally important, particularly in aircraft assembly work, that nut and bolt type fasteners be torqued sufficiently to assure a secure fastening. Normally, there are provided aligned openings in first and second members to be fastened together. A bolt is passed through these aligned openings and a nut is then power-threaded onto the bolt threads on the opposite side by a suitable power-driven tool.

To assure that the nut is securely fastened to the bolt, and yet in order to avoid the possibility of over torquing the nut which might damage the same, many of the power-driving tools include a clutch mechanism so that the tool will slip on the nut after a predetermined torque has been exceeded. However, the predetermined torque at which the clutch operates in the driving tool may vary or inadvertently fail to be readjusted for certain types of bolt and nut fasteners. Consequently, insecure fastenings can result and there is no visual means of determining such insecure fastenings.

The foregoing problem has been solved in the past by providing a nut having a driving head portion with a thinned wall section at the point that the driving head is secured to the remaining portion of the nut. The arrangement is such that the driving head portion of the nut will automatically shear or break-off when a predetermined torque is exceeded. With this arrangement, no clutch mechanism in the power tool is necessary. Further, a visual inspection of the various fastenings will indicate immediately if the fastening is secure; that is, those fastenings in which the driving head has been twisted off of the nut will pass inspection whereas if the driving head has not been twisted off of the nut, it will be immediately evident that the fastening has not been sufficiently torqued.

There still remain problems, however, with such fastenings. Temperature variations might tend to loosen the threaded nut on the bolt and subsequent vibrations could result in inadvertent unthreading. It would be desirable if there were some means for assuring that the nut would be locked to the bolt threads after proper pre-loading or torquing has been achieved. Further, in certain instances such as when exotic type metal is used for the nut, it is uneconomical to twist off the head of the nut and throw it away simply from the standpoint of loss of material.

BRIEF DESCRIPTION OF THE PRESENT INVENTION

The present invention comprehends a frangible type nut wherein the various advantages of proper pre-torquing to a desired degree by a power tool, whether provided with a clutch or not, and visual indications of proper torquing are all realized. In addition, the frangible nut of the present invention assures a locking of the nut structure to the bolt threads so that the fastening will remain intact even under severe temperature changes or vibration conditions, and in certain embodiments, the nut is designed to eliminate material waste.

The foregoing features and advantages are realized by providing a nut having an annular side wall with internal threads for mating with the bolt threads. This annular side wall has at least one annular groove intermediate its ends defining a thinned wall portion of a first given thickness. In a first embodiment of the invention, the portion of the nut that terminates in the enlarged driving head has a reduced diameter to define a second thinned wall portion of a second given thickness. The second given thickness is greater than the first given thickness but is less than the thickness of the remaining portions of the annular side wall.

With the foregoing arrangement, the nut may be threaded onto the bolt after passing the bolt through aligned openings in first and second members to be fastened together. Threading of the nut on the bolt by a suitable power tool will result in seating of the nut on the member through which the bolt extends and further torquing will then result in breaking of the annular side wall of the nut at the point of the first mentioned thinned wall section or annular groove. The first portion of the nut connected to the head can thus be rotated independently of the broken-away second portion of the nut. There is thus effectively provided two nuts.

Further rotation of the first nut portion by the power tool on the driving head results in a tightening of the first nut portion against the second nut portion thereby placing the bolt threads in tension. Still further torquing will then result in the second thinned wall portion breaking at the intersection of the annular side wall with the enlarged nut driving head, the dimensioning being such that breaking of the driving head from the first portion occurs after a predetermined torque or preloading has been exceeded. The resulting fastening thus provides a nut structure securely locked to the bolt. Moreover, visual inspection of the annular groove will indicate whether or not the desired locking feature has been achieved and visual inspection as to the presence or absence of the driving head of the nut will indicate whether or not proper pre-loading took place.

The first embodiment of the invention thus provides an improved nut which may readily be manufactured in integral form and yet, in effect, constitutes three not portions ultimately separated upon securing the nut to the bolt to complete the fastening.

In a second embodiment an additional annular groove is provided at the first thinned wall section to provide a finer degree of control of torque at which the first portion is broken away from the second portion. Proper torquing is indicated when the grooves are closed. In a third embodiment, the head need not utilmately be twisted off thereby conserving material.

BRIEF DESCRIPTION OF THE DRAWINGS

A better understanding of the invention will be had by now referring to the various embodiments thereof as illustrated in the accompanying drawings, in which.

DETAILED DESCRIPTION OF THE INVENTION

Figure 1:
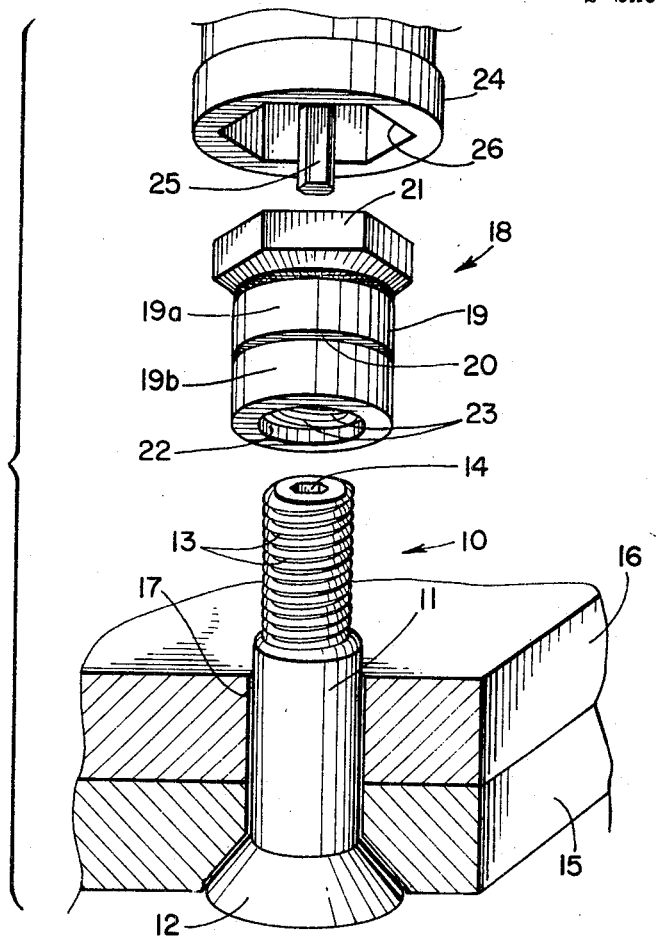
FIG. 1 is an exploded perspective view of the improved fastener of this invention with members to be fastened together shown in cross section.

Referring first to FIG. 1 the fastener includes a bolt designated generally by the numeral 10 including shank portion 11 terminating at one end in an enlarged head head 12. The other end of the shank 11 terminates in external bolt threads 13. The extreme end of the bolt may include an hexagonal socket 14 the purpose for which will become clearer as the description proceeds.

As shown, the bolt is arranged to be passed through first and second members 15 and 16 to be secured together. Normally, the members are provided with aligned openings as indicated at 17 for receiving the bolt shank 11.

The frangible nut in accord with a first embodiment of the invention is indicated at 18 in exploded view above the bolt 10. The nut 18 includes an annular side wall 19 provided with an annular groove 20 midway between its ends to divide the nut into first and second portions 19a and 19b. As shown the upper end of the side wall portion 19a terminates in an enlarged hexagonal driving head 21. The lower portion end of the side wall portion 19b includes a counterbored portion defining a recess 22 for accommodating a portion of the shank 11 should the thicknesses of the members 15 and 16 be less than the length of the shank.

The internal threads themselves are formed on the interior wall of the side wall 19 as indicated at 23.

The nose portion 24 of a power tool is illustrated above the nut 18 in FIG. 1 preparatory to driving the nut onto the bolt. This tool includes a central hexagonal shaft 25 arranged to be received in the hexagonal socket 14 at the end of the bolt 10. The shaft 25 is held stationary and thus holds the bolt stationary while the driving portion 24 of the tool drives the driving head 21 of the nut. Towards this end, the driving portion 24 includes an internal hexagonal socket 26 for cooperation with the driving hexagonal head 21.

Figure 2:
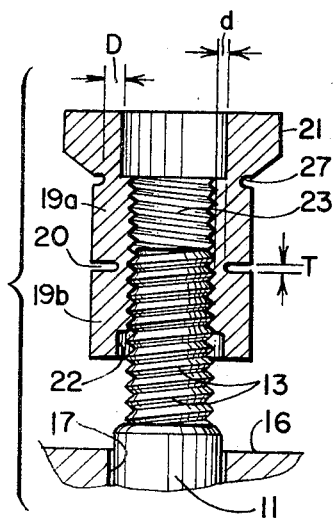
FIG. 2 is a fragmentary side elevational view of a portion of the bolt and the nut, the nut itself being shown in cross section illustrating the relative positions of the fastener during initial threading of the nut on the bolt.

FIG. 2 illustrates the nut in partially threaded position on the bolt. It will be noted that the annular groove 20 defines a thinned wall section for the annular side wall. This section defines a first given thickness designated by the letter $d$ in FIG. 2. It will also be noted that the annular side wall decreases in diameter at the point it intercepts the enlarged driving head 21 to define a second annular groove as indicated at 27. There is thus defined a second thinned wall section of a second given thickness as designated by the letter D in FIG. 2. This latter dimension D is made greater than the dimentioned $d$ defined by the first annular groove but less than the thickness of the remaining portions of the annular side wall.

Figure 3:
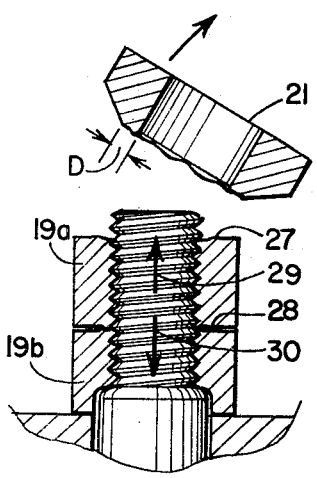
FIG. 3 is a view similar to FIG. 2 illustrating the portions of the fastener after complete fastening has been achieved.

FIG. 3 illustrates the condition of the nut after completely driving the same into locked position on the bolt. As shown, the annular side wall has been broken at the annular groove, the fracture taking place at the thinned wall portion 28 and the driving head 21 itself has been torqued off or broken from the annular side wall second thinned wall portion 27. A tension force as indicated by the arrows 29 and 30 results when the frangible nut has been completely tightened so that the nut portions 19a and 19b are thoroughly locked to the bolt.

Figure 4:
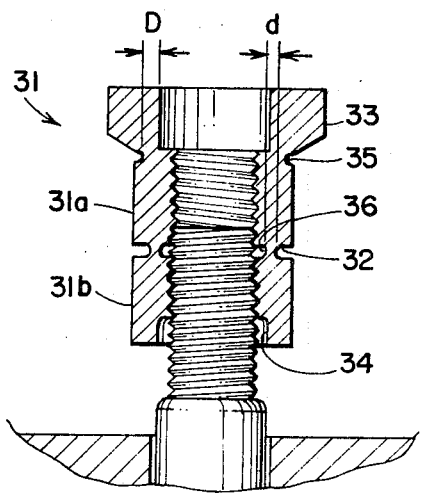
FIG. 4 shows a view similar to FIG. 2 of a seocnd embodiment of the invention.

FIG. 4 illustratess a second embodiment of the invention which incorporates a slight modification of the nut structure desicribed in FIGS. 1 to 3. In FIG. 4 there is shown a nut 31 having first and second annular wall portions 31a and 31b divided by an external annular groove 32. The upper end of the first wall portion 31a terminates in a head 33 and the lower end of the second portion 31b includes an internal recessed area 34. A second annular groove 35 beneath the head 33 at the point it connects to the first wall portion 31a is provided to define the thickness.

The above description of the nut 31 thus far is the same as that for the nut shown in FIGS. 1 to 3. In accord with the modification of FIG. 4, however, the nut is provided with an internal groove 36 in the same plane as the external groove 32. The external groove 32 is made slightly shallower such that the distance $d$ when measured between the respective floors of the two grooves will be the same as the dimension $d$ in the embodiments of FIGS. 1 to 3.

The purpose for the groove 36 is to remove the helical interior threads in the same plane as the external groove so that a uniform thinned wall portion is provided. There is thus omitted any possible helical thread which might cause a variation measured about the circumference of the wall portion in the distance $d$. The internal groove 36 enables a finer or more accurate degree of control over the torque necessary to break away the first portion of the nut from the second portion. In aero-space applications, the pre-loading or pre-torquing necessary to effect this breaking can become quite critical and thus for these particular applications, an internal groove would be provided as shown in FIG. 4.

Figure 5:
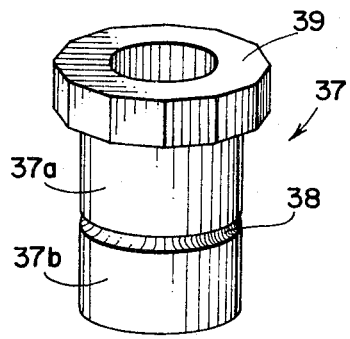
FIG. 5 is a perspective view of a third embodiment of the invention.

FIG. 5 illustrates another embodiment of the invention wherein there is provided a nut 37 having an external annular groove 38 to divide the nut body into first and second portions 37a and 37b. In the embodiment of FIG. 5, the upper end of the wall portion 37a terminates in a twelve sided head structure 39 for torquing by the conventional twelve point double-hexagon driving wrench.

Figure 6:
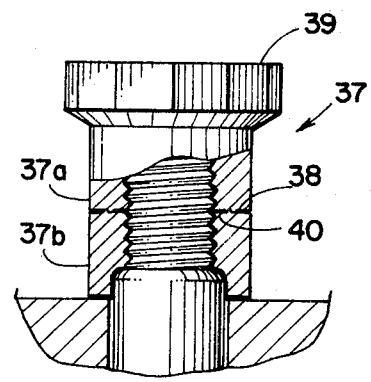
FIG. 6 is a partial cross-section of the nut of FIG. 5 after complete torquing.

FIG. 6 shows in partial cross section the nut of FIG. 5 after complete torquing has taken place. It will be noted that the nut of FIGS. 5 and 6 does not include a second annular groove beneath the head. In this embodiment, the head 39 does not twist off after completely tightening the nut; however, the thinned wall portion at the groove 38 will break away at a predetermined pre-torquing or preloading and proper locking will take place. As in the embodiment of FIG. 4, the nut of FIGS. 5 and 6 includes an internal groove 40 for enabling a finer degree of torque control.

OPERATION

The operation of the improved frangible nut fastener shown in FIGS. 1 to 3 will first be described.

Referring again to FIG. 1, the bolt 10 is first passed through the aligned opening 17 in the first and second members 15 and 16 to be fastened together. The nut 18 is then threaded onto the bolt threads 13 by means of the power tool 24, the shaft 25 being received in the hexagonal socket 14 of the bolt to hold the bolt stationary while the driving portion 24 of the tool rotates the driving head 21 of the nut.

With particular reference to FIGS. 2 and 3, when the end of the annular side wall seats on the second member 16 about the opening 17 at which the bolt exits, further rotation of the driving head will result in the annular side wall breaking at the annular groove 20. This torsional twisting or breaking will occur at the annular groove 20 prior to twisting off of the driving head 21 from the side wall since the dimension d is less than the dimension D. When the break occurs, the first portion of the side wall 19a will still be integrally connected with the driving head 21 and thus rotatable with the driving head. The second portion of the annular side wall 19b will be securely seated on the member 16.

With further rotation of the driving head 21, the first portion 19a will be threaded down against the second portion 19b as illustrated in FIG. 3 to essentially close the annular groove. The side wall portions 19a and 19b essentially function as two separate nuts at this point so that there is established in the bolt threads a tension as indicated by the arrows 29 and 30. The nut portions 19a and 19b are thus thoroughly locked to the bolt threads.

Still further rotation of the driving head 21 by the power driver will then ultimately result in twisting off of the head; that is, breaking a the point 27 as indicated in FIG. 3. The necessary torque to effect this latter breaking or twisting off is predetermined in such a manner that the sufficient tightening of the nut portions is realized without such undue tightening as would damage the threads and render the fastening useless.

With frangible nuts secured in the manner described above, an inspection to determine if all fastenings are proper can readily be carried out. Thus, the closure of the annular groove as indicated in FIG. 3 will indicate proper pre-torquing or pre-loading of the nut portion 19b and locking of the nut portions to the bolt while the absence of the driving head 21 will indicate proper pre-torquing or pre-loading of the nut portion 19a. Thus there is provided an automatic double pre-loading.

Further, since the two nut portions provide an effective lock to the bolt threads, no distorted threads are necessary as required heretofore to provide a thread lock. Thus, existing tools or even hand tools can be used, the nut being free running onto the threads. In addition, the thread loading by the two nut portions on the bolt threads is distributed rather than concentrated as occurs with a single nut.

An identical operation takes place with respect to the nut structure of FIG. 4 except, as noted, the first pre-loading or pre-torquing limit at which the first and second portions separate from each other can be more accurately controlled as a consequence of the provision of the internal groove 36.

In operating the nut structure of FIGS. 5 and 6, again proper pre-loading of the second nut portion against the work is realized by controlling the thickness of the thinned wall portion defined by the grooves 38 and 40. Subsequent threading of the first portion down against the second portion to provide the locking feature, however, would be carried out with a twelve point driving tool incorporating a clutch properly set to define the second torque or pre-loading so that no twisting off of the head would take place.

In the embodiment of FIGS. 5 and 6, it will be evident that a certain advantage is lost in that the clutch of the driving tool must be properly pre-set whereas in the earlier described embodiments, proper setting torque is automatically realized upon twisting off of the head. However, this disadvantage is more than overcome in most instances where exotic metals are used for the nut in question, since there is no waste of any of the nut material.

From the foregoing description, it will thus be evident that the present invention has provided a greatly improved fastener wherein all of the various advantages heretofore discussed have been fully realized.

What is claimed is:

1. In a fastener including a bolt having external threads for passing through aligned openings in first and second members to be secured together, the improvement comprising: a frangible nut having an annular side wall with an annular groove intermediate the ends of the side wall defining a first thinned annular wall section dividing the nut into first and second portions, said annular side wall of said first portion terminating at one end in a driving head having wrench flats, and including a second thinned annular wall section at its point of termination in said driving head of greater thickness than said first thinned annular wall section and of less thickness than the remaining portions of said annular side wall, the interior of said side wall having internal threads between its ends for threadably receiving said bolt, whereby threading of said nut onto said bolt by driving said driving head, seats said second portion on the member to be fastened from which said bolt extends, further rotation of said driving head breaking said first portion from said second portion at said first thinned annular wall section to thereby effectively provide two nuts, said first portion being threaded against said second portion to provide a locking of said nut portions to said bolt threads, final driving of said driving head breaking away said driving head from said first portion at said second thinned annular wall section, after a given predetermined torque is exceeded.

2. The subject matter of claim 1, in which said annular groove is formed exteriorly and in which said nut is provided with an internal annular groove in the same plane as the exterior groove so that a uniform thinned wall section is defined between said grooves, the thickness of which may be carefully controlled to define a given preloading necessary to break said first portion from said second portion, said preloading being less than said predetermined torque.

3. A frangible nut fastener comprising, in combination:

(a) a bolt having a shank terminating at one end in an enlarged head and at its other end in external threads for passing through aligned openings in first and second members to be secured together; and (b) a nut having an annular side wall defining internal threads for threadedly receiving said bolt threads and terminating at one end in an enlarged driving head having wrench flats for power rotation by a driving tool, said side wall receiving the initial threads of said bolt in its other end, said annular side wall having an annular groove intermediate its said one end and other end to define a first thinned wall portion of a first given thickness, the wall thickness at said one end of the wall that terminates in said enlarged driving head having a reduced diameter to define a second thinned wall portion of a second given thickness, greater than said first given thickness and less, than the thickness of the remaining portions of said annular side wall.

whereby power rotation of said nut by driving said driving head to thread the nut to said bolt will seat said other end of said side wall on the outer surface surrounding the exit opening in the second member through which said bolt passes, further power rotation of said driving head causing said side wall to break under the torsional forces created therein at said annular groove such that a first portion of said side wall still connected to said driving head is rotatable relative to a remaining second portion broken therefrom to provide effectively two nuts, rotation of said first portion tightening the same against said second portion to place the bolt threads respectively threaded to said portions in tension and thereby provide a locking of said bolt to said nut portions, said driving head subsequently breaking away from said first portion at said second thinned wall portion after a given predetermined torque has been exceeded, said first given thickness being such that a predetermined torque loading less than said given predetermined torque must be exceeded to break said first portion from said second portion, said predetermined torque loading being sufficient to assure secure seating of said second portion on said second member.

4. The subject matter of claim 3, in which said annular groove is formed exteriorly and in which said nut is provided with an internal annular groove in the same plane as the exterior groove so that a uniform thinned wall portion is defined between said grooves, the thickness of which may be carefully controlled to define said predetermined torque loading necessary to break said first portion from said second portion.

5. A fastener according to claim 3, in which said other end of said annular side wall receiving said initial bolt threads is counterbored to define an enlarged recess for receiving a portion of the shank of said bolt to thereby provide accommodation for different thicknesses of said members to be fastened together.

References Cited
UNITED STATES PATENTS

| | | | |
|---|---|---|---|
| 1,457,749 | 6/1923 | Rast | 85—61 |
| 3,311,147 | 3/1967 | Walker | 85—61 X |
| 3,444,775 | 5/1969 | Hills | 85—61 |

RAMON S. BRITTS, Primary Examiner

U.S. Cl. X.R.

151—21